(12) United States Patent
Daeuber et al.

(10) Patent No.: US 10,940,827 B2
(45) Date of Patent: Mar. 9, 2021

(54) BELT RETRACTOR HAVING A FORCE LIMITER

(71) Applicant: TRW AUTOMOTIVE GMBH, Alfdorf (DE)

(72) Inventors: Markus Daeuber, Eislingen (DE); Stefan Eisele, Wissgoldingen (DE); Michael Sautter, Ludwigsburg (DE); Ralph Stegmaier, Alfdorf (DE); Martin Roehrle, Mutlangen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 217 days.

(21) Appl. No.: 16/090,827

(22) PCT Filed: Apr. 5, 2017

(86) PCT No.: PCT/EP2017/058075
§ 371 (c)(1),
(2) Date: Oct. 3, 2018

(87) PCT Pub. No.: WO2017/174639
PCT Pub. Date: Oct. 12, 2017

(65) Prior Publication Data
US 2019/0118763 A1    Apr. 25, 2019

(30) Foreign Application Priority Data
Apr. 6, 2016 (DE) .................. 10 2016 106 303.7

(51) Int. Cl.
*B60R 22/34* (2006.01)
*B60R 22/46* (2006.01)
*B60R 22/28* (2006.01)

(52) U.S. Cl.
CPC ........ *B60R 22/341* (2013.01); *B60R 22/4628* (2013.01); *B60R 22/4676* (2013.01); *B60R 2022/285* (2013.01); *B60R 2022/468* (2013.01); *B60R 2022/4642* (2013.01)

(58) Field of Classification Search
CPC .............. B60R 22/341; B60R 22/4676; B60R 22/4628; B60R 22/3413; B60R 2022/286; B60R 2022/288; B60R 22/34
See application file for complete search history.

(56) References Cited

U.S. PATENT DOCUMENTS

| | | | |
|---|---|---|---|
| 2003/0071452 A1* | 4/2003 | Siegfried | B60R 22/3413 280/801.1 |
| 2007/0200022 A1* | 8/2007 | Jabusch | B60R 22/3413 242/382 |
| 2010/0155519 A1 | 6/2010 | Moedinger et al. | |
| 2013/0126657 A1* | 5/2013 | Stroik, Jr. | B60R 22/3413 242/379.1 |
| 2013/0320127 A1* | 12/2013 | Singer | B60R 22/341 242/383 |

* cited by examiner

*Primary Examiner* — Sang K Kim
(74) *Attorney, Agent, or Firm* — Tarolli, Sundheim, Covell & Tumino LLP

(57) ABSTRACT

The invention relates to a belt retractor comprising a frame (10), a belt reel (12) rotatably arranged within the frame (10), a blocking mechanism (18) by which the belt reel (12) can be blocked within the frame (10), and a load limiter which comprises a corrugated disk (36), characterized in that the corrugated disk (36) is disposed between the belt reel (12) and a cover (38) which is laterally attached to the belt reel (12).

20 Claims, 9 Drawing Sheets

BELT RETRACTOR HAVING A FORCE LIMITER

RELATED APPLICATIONS

This application corresponds to PCT/EP2017/058075, filed Apr. 5, 2017, which claims the benefit of German Application No. 10 2016 106 303.7, filed Apr. 6, 2016, the subject matter of which are incorporated herein by reference in their entirety.

BACKGROUND OF THE INVENTION

The invention relates to a belt retractor comprising a frame, a belt reel rotatably disposed in the frame, a blocking mechanism by which the belt reel can be blocked within the frame, and a load limiter including a corrugated disk.

Said belt retractor is known from DE 10 2008 063 639 A1. It serves for providing a seat belt for a vehicle occupant of an automotive vehicle. During normal operation the vehicle occupant can freely unwind the seat belt from the belt reel against the action of a wind-up spring, and the belt reel winds up the seat belt again when the vehicle occupant unfastens the seat belt, for example. In response to external parameters, such as, for example, the deceleration of the vehicle or the rotational acceleration of the belt reel during webbing extension, the blocking mechanism by which the belt reel can be blocked within the frame is activated.

When the belt reel is blocked within the frame, until a predefined load level is reached within the seat belt no more seat belt can be unwound from the belt reel; the belt reel does not rotate relative to the frame of the belt retractor, apart from minimum yielding which is due to the inherent elasticity of all components present in the flux of force.

When the predetermined load level is reached, the load limiter will become active. It enables the belt reel to rotate relative to the frame under the effect of the tensile load of the seat belt. In this way, a particular amount of seat belt is released which is available as an additional path for the deceleration of the vehicle occupant.

The load limiter employed here usually is a torsion rod which at one end is fixedly coupled to the belt reel and at the other end is fixedly coupled to the frame.

Up-to-date belt retractors usually comprise a second load limiter to the load level of which it will be changed when the afore-described load-limiting phase has been completed. In the second phase of load limitation, too, a particular amount of seat belt can be unwound from the belt reel. The load required to this end within the seat belt is below the load during the first load-limiting phase, however, in which the two load limiters usually are active in parallel so that the load level thereof is added up.

The two load-limiting phases usually are adapted to each other so that the first load-limiting phase enables the thorax of the vehicle occupant to move forward until it contacts an airbag, and the second load-limiting phase enables the thorax of the vehicle occupant to immerse into the airbag.

In the belt retractor known from the afore-mentioned document DE 10 2008 063 639 A1 the second load limiter is formed by the corrugated disk which can be clamped between two corrugated surfaces and can be rotated relative to the latter so that it has to meander between the two corrugated surfaces.

SUMMARY OF THE INVENTION

It is the object of the invention to impart a compacter design to the belt retractor.

For achieving this object in a belt retractor of the type mentioned in the beginning the corrugated disk is provided to be arranged between the belt reel and a cover which is attached laterally to the belt reel. In this way, a design which is especially compact in the axial direction can be obtained. In accordance with one embodiment of the invention, the corrugated disk is provided to be flat in the initial condition. This results in the fact that the corrugated disk is retained, in the mounted state, between the cover and the belt reel in a corrugated condition so that, due to its inherent elasticity, it is adjacent with a bias to the dedicated surfaces.

One of said surfaces is a first corrugated surface dedicated to the belt reel. Said corrugated surface rotates along with the belt reel.

Basically, it is possible that the first corrugated surface is provided on a separate component which is mounted to the belt reel. Preferably, the first corrugated surface is directly formed by an end face of the belt reel, however. In this way, the axial construction length is minimized as no separate component is required for the second corrugated surface.

Another one of the surfaces with which the corrugated disk interacts is a second corrugated surface dedicated to the cover. The second corrugated surface, too, is coupled to the belt reel in a rotationally fixed manner so that it co-rotates with the latter.

The second corrugated surface may basically be arranged on a component separate from the cover. Of preference, the second corrugated surface is formed by the inner surface of the cover, however. In this manner, the axial construction space is further reduced.

Preferably, the corrugated surface has a sinusoidal contour. The sinusoidal contour excels by a smooth transition between raised and recessed portions so that the corrugated disk is gently deformed when it is rotated between the corrugated surfaces.

The cover is preferably connected to the belt reel in a rotationally fixed manner. Accordingly, the second corrugated surface dedicated to the cover is ensured to co-rotate with the belt reel.

Preferably, the cover is provided with plural lands engaging in recesses in the belt reel. In this way, a very simple rotational drive can be achieved.

Preferably, the belt reel and the cover are fastened to each other in the axial direction by means of a crimping ring. The latter is attached to the cover from outside and is flanged or crimped on its side facing the belt reel so that it encompasses a flange of the belt reel. Thus, the cover is reliably fastened to the belt reel in the axial direction.

According to one configuration of the invention the corrugated disk is provided to have a driving design at its inner circumference. The driving design at the inner circumference enables a torque to be exerted on the corrugated disk while at the same time a compact design is maintained.

The driving design may be a collar which is formed integrally with the disk-shaped portion of the corrugated disk and has a toothed profile. This type of driving design may be produced at low cost by plastically reshaping a disk-shaped blank.

Preferably, the driving design is connected in a rotationally fixed manner to a torsion rod which constitutes a second load limiter. Due to its arrangement along the axis of rotation of the belt reel, the torsion rod is especially suited for introducing a torque into the corrugated disk.

Preferably, the corrugated disk is provided to be connected to the belt reel at one end of the belt reel and the torsion rod is provided to be connected to the belt reel at the other end. In this design, the load limiter formed by the corrugated disk is automatically connected in parallel to the load limiter formed by the torsion rod.

BRIEF DESCRIPTION OF THE DRAWINGS

Hereinafter the invention shall be described by way of an embodiment as illustrated in the attached drawings, wherein.

DESCRIPTION

Figure 1:
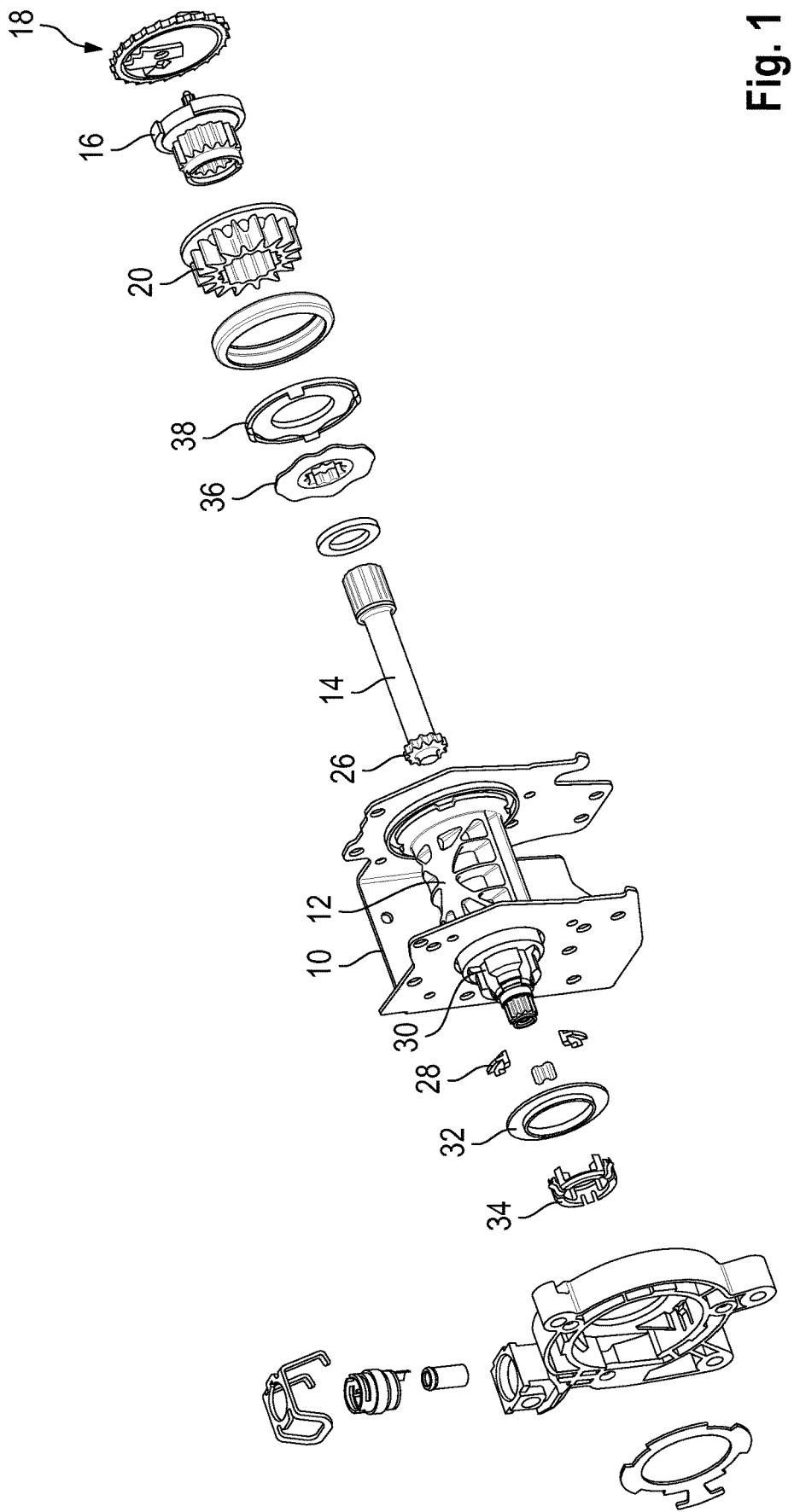
FIG. 1 shows an exploded view of the belt retractor according to the invention.
Figure 2:
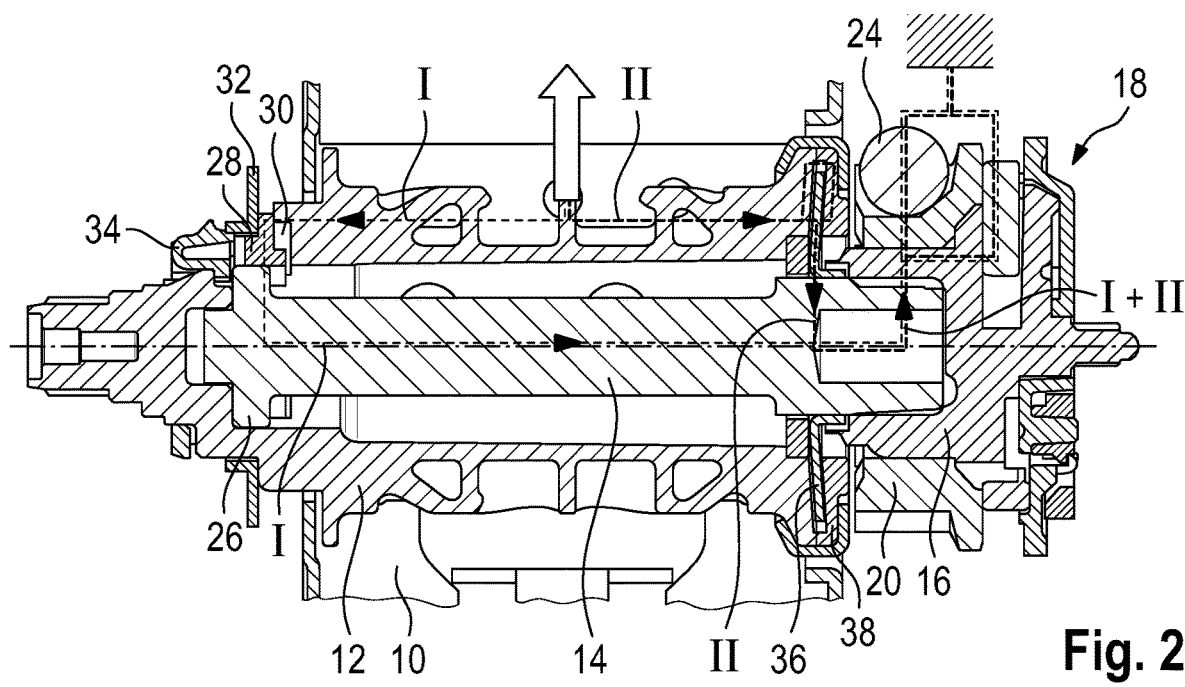
FIG. 2 shows a section across the belt retractor of FIG. 1.

By way of FIGS. 1 and 2, initially the general structure of the belt retractor is explained.

The belt retractor as a self-supporting component includes a frame 10 in which a belt reel 12 is arranged.

A torsion rod 14 which is the core part of a load limiter extends through the belt retractor. The torsion rod 14 is dedicated at one end (the left end in the Figures) to the belt reel 12 and at the other end (the right end in the Figures) is accommodated in a hub 16 in a rotationally fixed manner. At the hub a blocking mechanism 18 not explained in more detail here is disposed which serves for blocking the hub 16 fixedly relative to the frame 10, where necessary.

Figure 13:
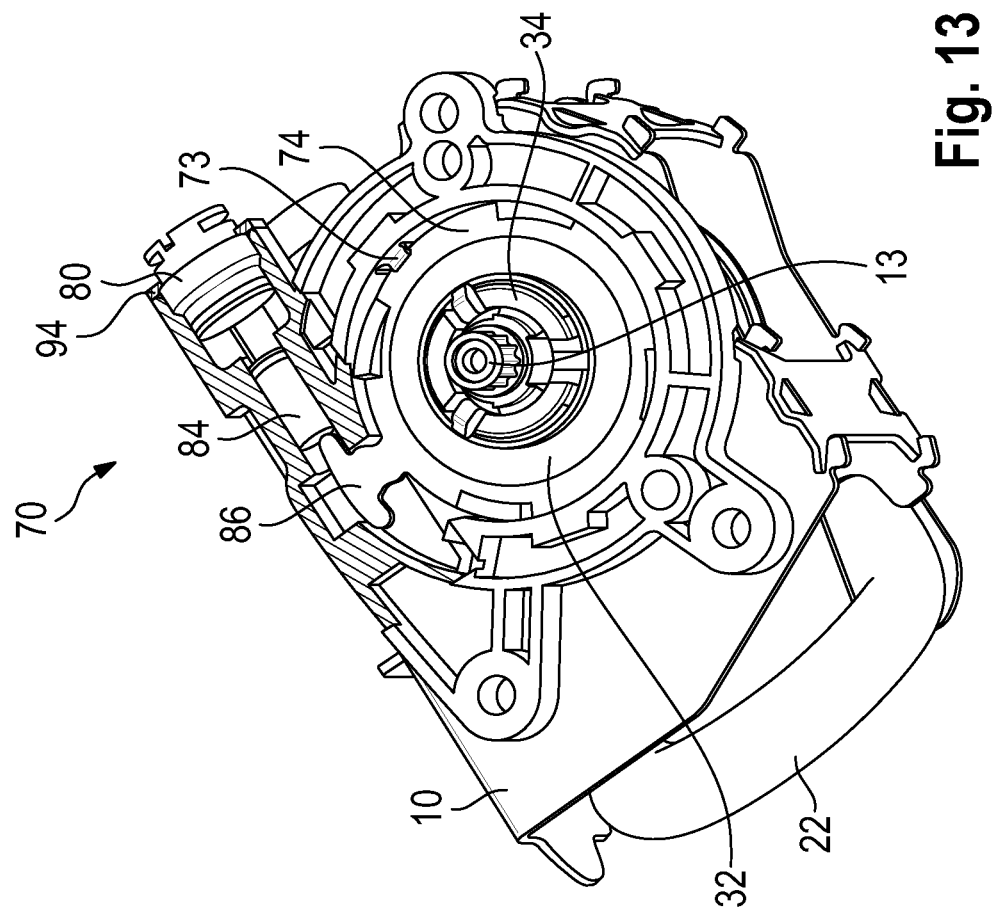
FIG. 13 shows a perspective partially cut view of the actuator of FIG. 12 mounted on the belt retractor, with the actuator being provided in the initial position.

Also, a drive wheel 20 is connected to the hub 16 in a rotationally fixed manner, with a so-called pre-tensioner, for example an electric motor, or a main tensioner, for example a load transmission element 24 adjustable in a piston 22 visible in FIG. 13 by a pyrotechnical charge, being capable of acting upon said drive wheel.

The effects of the pre-tensioner and of the main tensioner are generally known and therefore shall be explained only roughly here. The pre-tensioner serves for rotating the belt reel in the winding direction, where necessary, so that the webbing is tensioned up to a particular pre-tensioning load. This operation is reversible. The main tensioner serves for driving the belt reel in the winding direction, where necessary, so that a definitely higher tensioning load is obtained within the webbing. The main tensioner can be activated merely once.

At its end associated with the belt reel 12 the torsion rod 14 is provided with a driving toothing 26 in which the points of plural bars 28 engage, the bars being arranged in corresponding recesses 30 of the belt reel. There the bars 28 are retained by a support ring 32 which is fixed on the belt reel 12 by means of a holder 34.

When a torque is exerted on the belt reel 12, for example by tension acting on the seat belt, said torque is transmitted via the edges of the recesses 30 and the bars 28 to the torsion rod 14 and from there into the hub 16. Assuming that the hub 16 is blocked fixedly relative to the frame, also the belt reel 12 is prevented from rotating relative to the frame, in any case as long as the acting torque is below the torque at which the torsion rod 14 is plastically twisted. The load transmission path mentioned here is indicated by broken lines in FIG. 2 with reference numeral I.

On the side of the belt reel 12 opposed to the bars 28, a corrugated disk 36 which is a central component of a further load limiter is arranged. The corrugated disk 36 is connected to the torsion rod 14 in a rotationally fixed manner at the end thereof associated with the hub 16 and is elastically clamped in the axial direction between an end face of the belt reel 12 and a cover 38.

The corrugated disk 36 may be rotated between the belt reel 12 and the cover 38, when the acting torque is higher than a holding torque of the corrugated disk 36 which is composed of a friction component and a resistance of the corrugated disk against deformation.

With respect to the second load limiter, a second load path inserted in FIG. 2 by broken lines with reference numeral II extends from the belt reel to the corrugated disk, from the corrugated disk into the torsion rod and from the latter ultimately into the hub 16.

Figure 3:
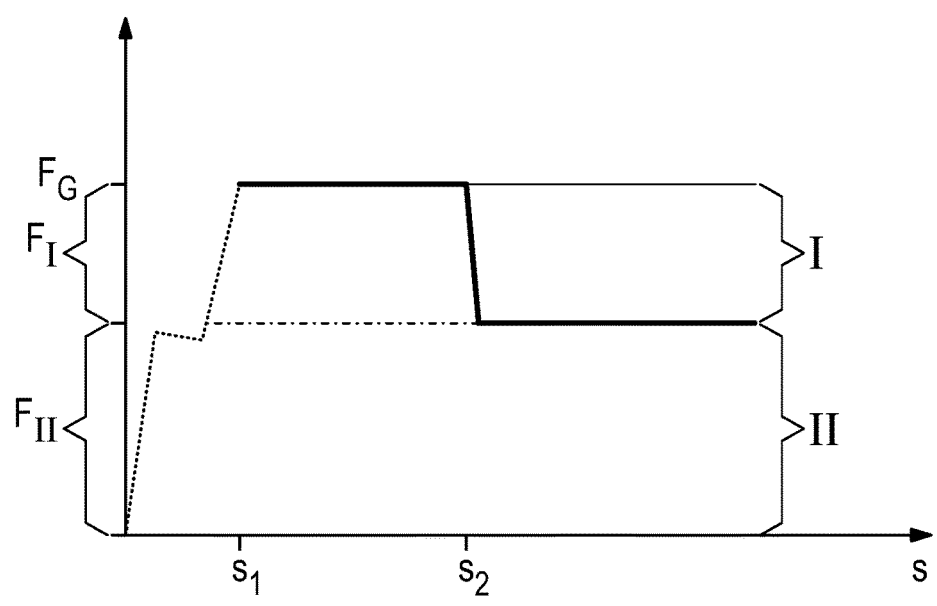
FIG. 3 shows a diagram of the acting webbing load over the length of extended webbing.

By way of FIG. 3, the load limitation shall be explained as follows.

In the initial condition, both the load limiter utilizing the torsion rod 14 and the load limiter utilizing the corrugated disk 36 are active. In the diagram of FIG. 3, this corresponds to a webbing extension from $s_1$ to $s_2$. In this phase, the two load limiters act in parallel so that in the seat belt a total load $F_G$ is resulting herefrom which is composed of a load $F_I$ defined by the torsion rod 14 and a load $F_{II}$ defined by the corrugated disk 36.

At the point $s_2$ the load limiter utilizing the torsion rod 14 is switched off so that only the load limiter utilizing the corrugated disk 36 continues to be active. Accordingly, the load within the webbing decreases to the load $F_{II}$.

Hereinafter, the structure of the load limiter comprising the corrugated disk 36 shall be explained in detail by way of FIGS. 4 to 8.

The corrugated disk 36 has a flat disk-shaped portion 40 in the initial condition.

At its inner circumferential edge, the corrugated disk 36 includes a collar 42 extending in the axial direction. The collar 42 is formed integrally with the disk-shaped portion 40 and shows a driver design, here in the form of a toothed profile.

The toothed profile of the driver design 42 of the corrugated disk 36 is fixedly attached to an external toothing 44 by which the torsion rod 14 is also fixedly accommodated within the hub 16. Thus, the corrugated disk 36 is coupled in a rotationally fixed manner both to the right end of the torsion rod 14 in the Figures and to the hub 16.

The corrugated disk 36, more exactly speaking the disk-shaped portion 40 thereof, is arranged between a first corrugated surface 46 and a second corrugated surface 48.

The first corrugated surface 48 is one of the end faces of the belt reel 12. As is evident especially from FIG. 4a and from FIG. 7, the first corrugated surface 48 is provided with a sinusoidal profile at its edge located outside in the radial direction (cf. also FIG. 8). As is evident from the projection P of the profile of the first corrugated disk 48 related to FIG. 7, the outer circumference A extends in sinusoidal shape, while the inner circumference I forms a flat circle. For the concrete contour at the outer circumference, the following formula has turned out to be useful (cf. also the coordinate system inserted in FIG. 8): $y = 0.8 \cdot \sin x$.

The second corrugated surface 48 is configured as the inner surface of the cover 38. The contour of the second corrugated surface 48 corresponds to the contour of the first corrugated surface 46: At the inner circumference of the cover 38 the second corrugated surface 48 extends along a flat circle, while the second corrugated surface shows a sinusoidal curve at its outer circumference (cf. especially FIG. 4a).

Figure 4A:
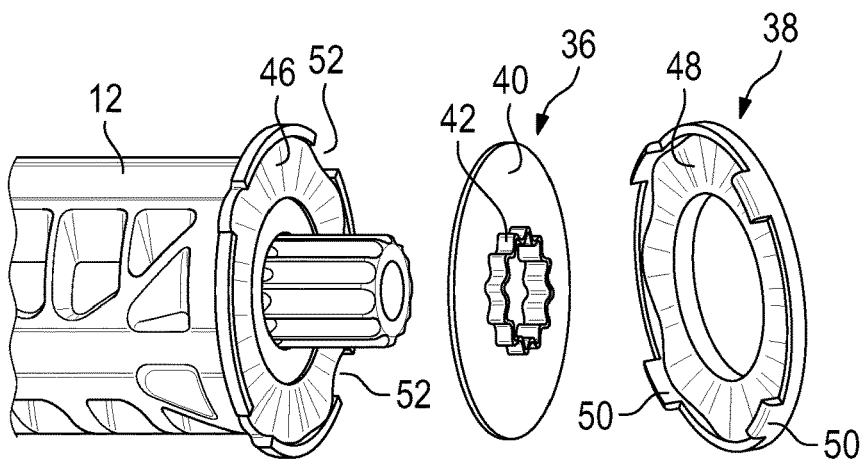
FIGS. 4a to 4c show a perspective view of different steps of mounting the corrugated disk to the belt reel.
Figure 4B:
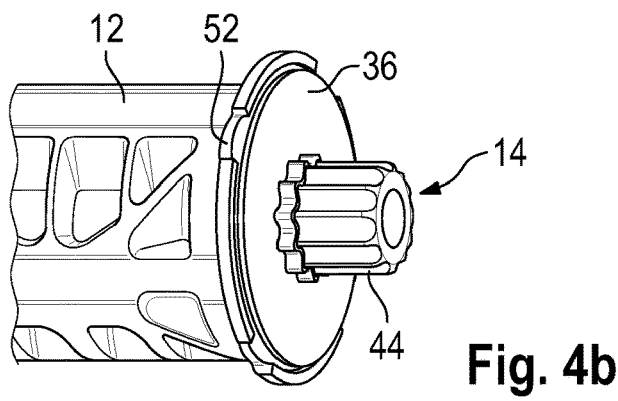
Figure 4C:
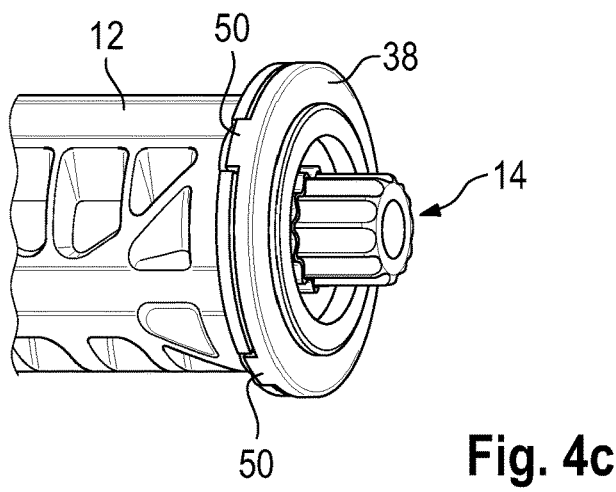

When the corrugated disk 36 is mounted, it is pushed onto the torsion rod 14 disposed within the belt reel 12, and more exactly speaking, to the outer toothing 44 thereof (cf. FIGS. 4a and 4b). Subsequently, the cover 38 is pushed on in the axial direction, wherein said cover is provided with plural lands 50 which engage in corresponding recesses 52 being provided outside the first corrugated surface 46 at the outer circumference of the belt reel 12. In this way, the cover 38 is fixed to the belt reel 12 in a rotationally fixed manner (cf. FIG. 4c), but in the pre-assembled state it is axially movable.

Figure 5A:
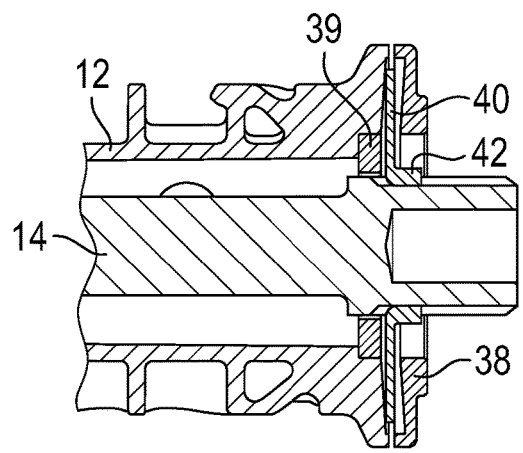
FIGS. 5a and 5b show a schematic sectional view of two steps when mounting the corrugated disk to the belt reel.
Figure 6A:
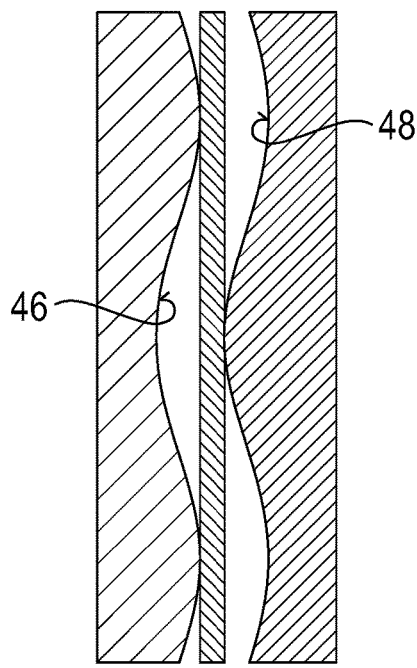
FIGS. 6a and 6b show a schematic section of the corrugated disk between the corrugated surfaces associated therewith during the mounting steps of FIGS. 5a and 5b.

In said pre-assembled state, the disk-shaped portion 40 of the corrugated disk 36 defines the distance between the first and second corrugated surfaces 46, 48 (cf. FIGS. 5a and 6a).

In order to completely mount the corrugated disk 36 with respect to its function as a load limiter, a crimping ring 54 having a C-shaped cross-section in the initial condition is pushed onto the cover 38. The cover 38 together with the crimping ring 54 then is pressed against the belt reel 12 in the axial direction until the disk-shaped portion 40 of the corrugated disk is deformed between the two corrugated surfaces 46, 48 (cf. especially FIG. 6b), and the portion of the crimping ring 54 dedicated to the belt reel 12 is flanged or crimped in the direction of the arrow P of FIG. 5b so that the cover 38 is tightly attached to the belt reel 12 in the axial direction. Inside the end face of the belt reel 12 forming the first corrugated surface 46, the torsion rod 14 is supported in a bearing ring 39 in the area of the outlet from the belt reel 12. In this way, also the corrugated disk is centered between the belt reel 12 and the cover 38.

Figure 5B:
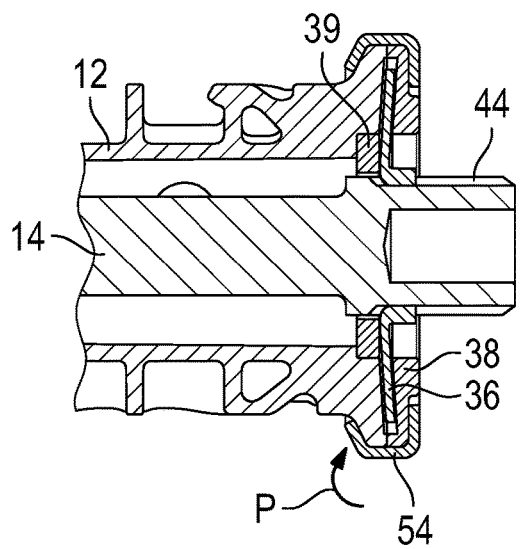
Figure 6B:
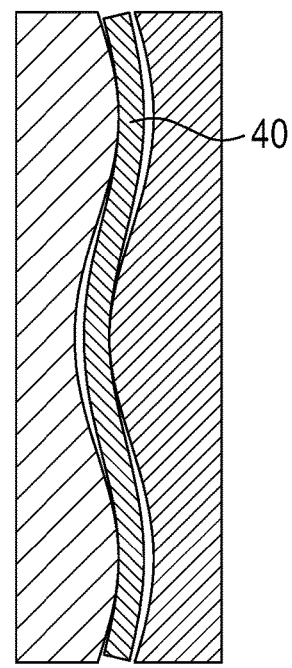
Figure 7:
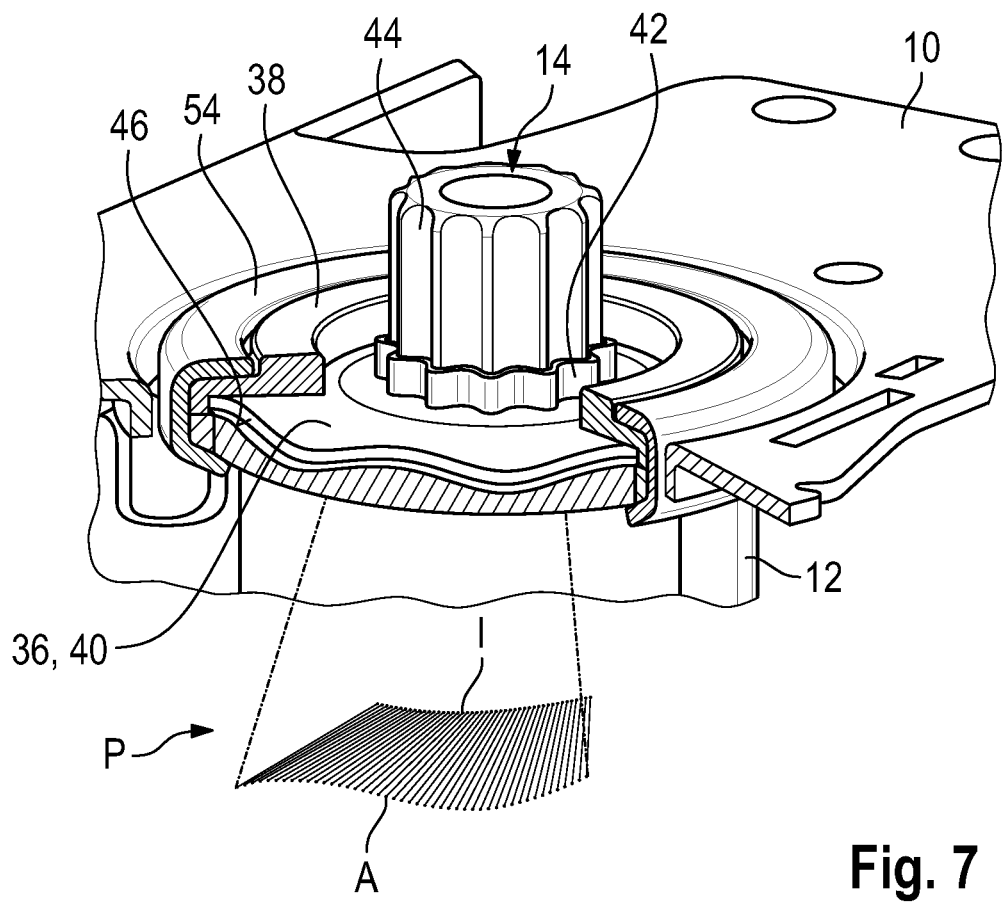
FIG. 7 shows a perspective partially cut view of the corrugated disk in the completely mounted state.
Figure 8:
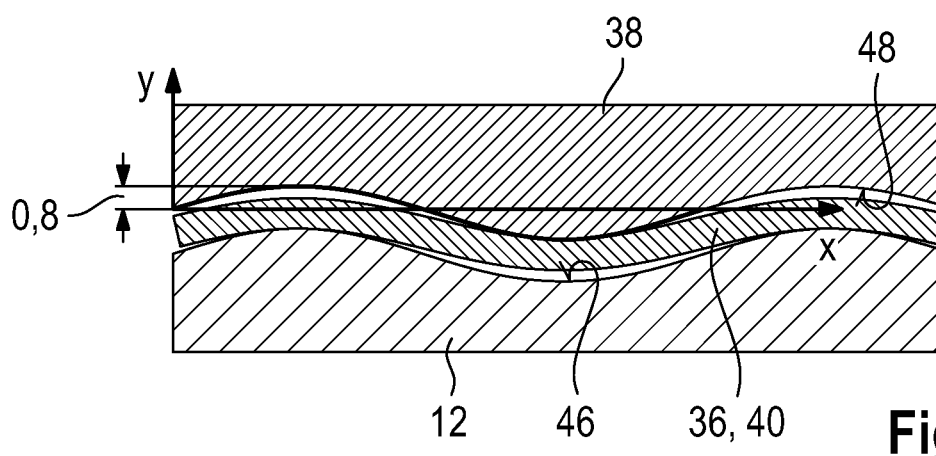
FIG. 8 shows a detail of the corrugated disk disposed between the corrugated surfaces in a schematic sectional view.
Figure 9:
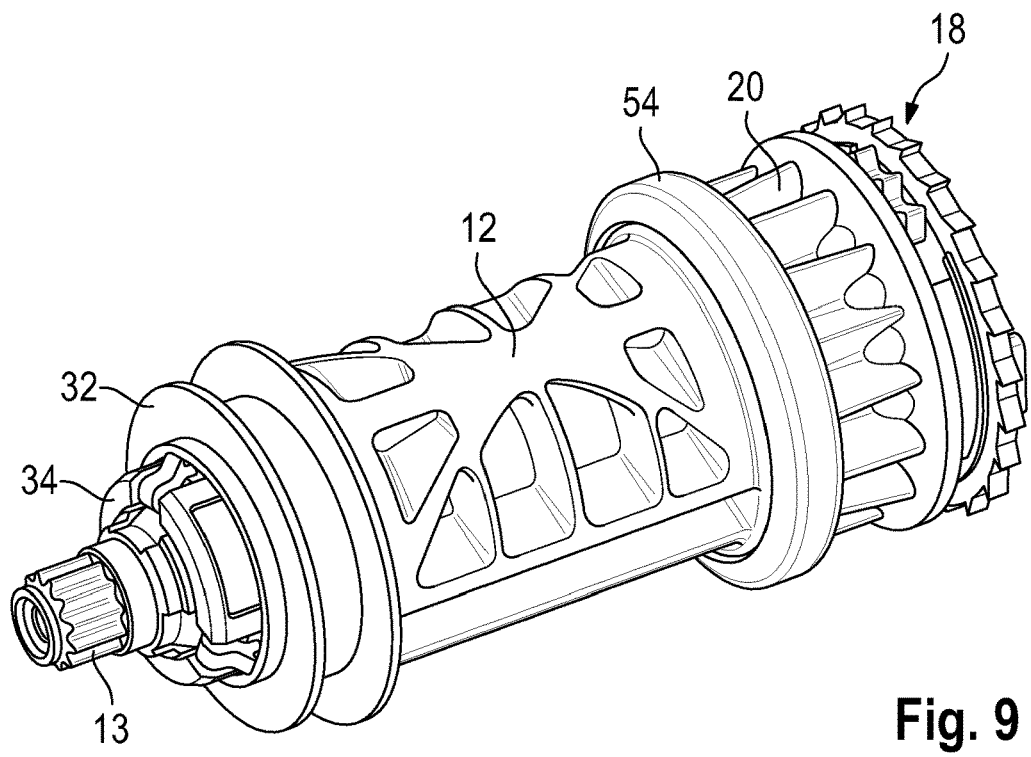
FIG. 9 shows a perspective view of the completely mounted belt reel.

When considering, for example, FIGS. 5b and 6b, it is evident that, when the belt reel 12 is rotated relative to end of the torsion rod 14 provided with the external toothing 44, the corrugated disk 36 rotates relative to and between the corrugated surfaces 46, 48. The corrugated disk 36 counters said rotation by a resistance moment that is composed of a friction component and a deformation force component.

The friction component is defined by the surface nature and the contact force between the corrugated disk 36, on the one hand, and the two corrugated surfaces 46, 48, on the other hand. The deformation force component is defined by the resistance of the disk-shaped portion 48 which the latter sets against continuous deformation along the sinusoidal contour of the two corrugated surfaces 46, 48. In other words: By rotation of the corrugated disk 36 relative to the corrugated surfaces 46, 48 the corrugated disk 36 will be continuously bent in opposite directions especially along its outer circumference.

By way of the FIGS. 9 to 14, the structure of the load limiter utilizing the torsion rod 14 shall hereinafter be described.

It is the substantial characteristic of the load limiter utilizing the torsion rod 14 that the belt reel 12 can be uncoupled from the torsion rod 14. In this state, solely the load limiter utilizing the corrugated disk 36 is active.

In the initial condition of the belt retractor, viz. during "normal operation", the belt reel 12 is tightly coupled to the torsion rod 14, however. For this purpose, the bars 28 already mentioned before are used which are arranged in recesses 30 of the belt reel 12.

Figure 10:
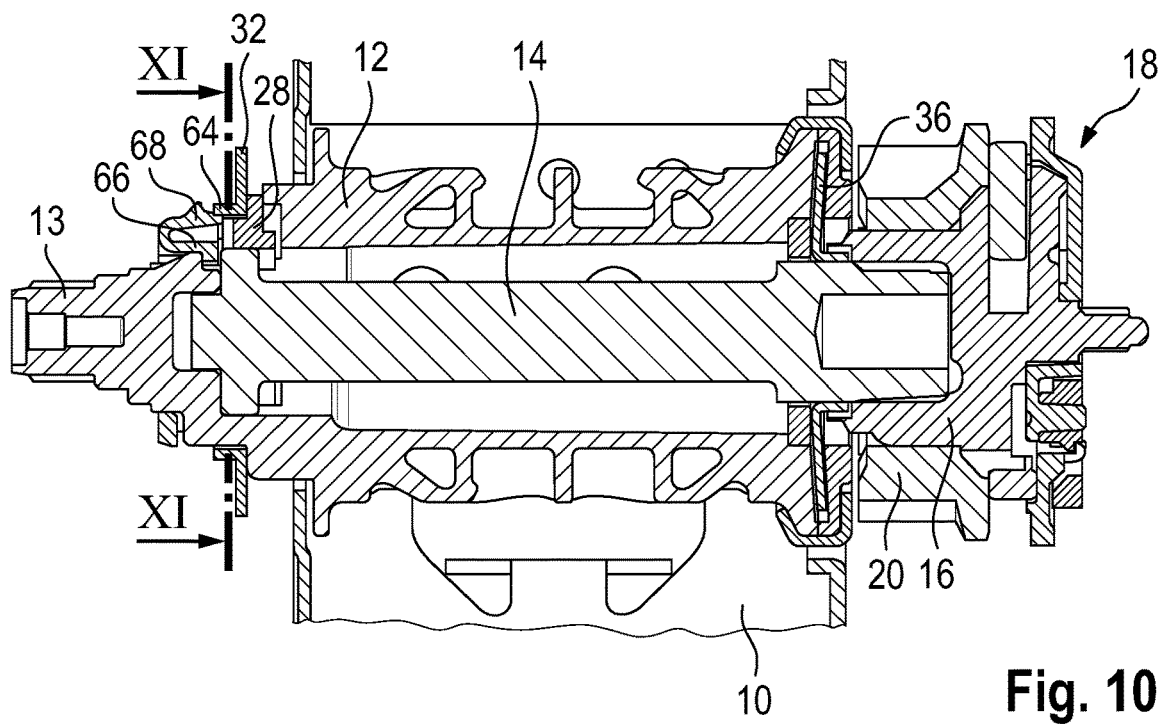
FIG. 10 shows a section across the belt reel of FIG. 9.
Figure 11:
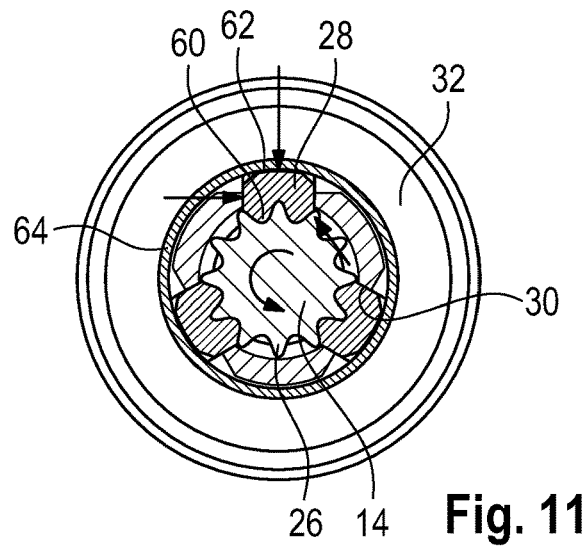
FIG. 11 shows a section along the plane XI-XI of FIG. 10.

The bars 28 are illustrated more clearly in the FIGS. 10 and 11. At their radially inner end, they include two teeth 60 which engage in the driving toothing 26 of the torsion rod 14.

In the position shown in FIG. 11 in which the bars 28 are located inside the recesses 30 and the teeth 60 engage in the driving toothing 26, a torque can be transmitted from the belt reel 12 to the torsion rod 14. This is accomplished by the fact that the edge of the corresponding recess 30 located at the rear in the direction of rotation drives the bar 28 and the latter in turn rotates the driving toothing 26 of the torsion rod 14 via the flanks of the teeth 60 located at the front in the circumferential direction.

The support ring 32 is in charge of the fact that during torque transmission the bars 28 are not outwardly pressed out of the recesses 30. More exactly speaking, each of the bars 28 abuts, with a shoulder 62, on the inner circumference of the support ring 32.

The support ring 32 in this case is provided with a support collar 64 bent in the axial direction.

In the position shown in the FIGS. 9 to 14, the support ring 32 is fixed by the holder 34 briefly mentioned in the foregoing.

The holder 34 is a plastic injection-molded part which is cage-shaped. In the broadest sense, the holder 34 is ring-shaped so that it is pushed onto an extension 13 of the belt reel 12.

The holder 34 includes plural radially inwardly effective detent arms 66 by which it is fixed on the belt reel 12 in the axial direction.

Moreover, the holder 34 includes plural radially outwardly acting retaining arms 68 to which the support collar 64 of the support ring 32 is adjacent. In this way, the support ring 32 is fixed on the belt reel 12 in the axial direction so that it supports the bars 28 in the radial direction in order to prevent the latter from leaving the recesses 30 when a torque is transmitted from the belt reel to the torsion rod.

In order to release the coupling between the belt reel 12 and the torsion rod 14, the support ring 32 may be displaced in the axial direction until it stops supporting the bars 28 in the axial direction. For this purpose, an actor 70 is provided, as especially shown in FIG. 12.

The actor 70 comprises a case 72 in which a lifting ring 74 is rotatably accommodated. The lifting ring includes, along its outer circumference, plural radially orientated abutting edges 76 which are provided for interacting with lifting ramps 78 being disposed in the case.

When the lifting ring 74 is in its initial position, the abutting edges 76 abut on the "lower" end of each lifting ramp 78, viz. relating to FIG. 13 in the area of each lifting ramp respectively provided further clockwise. When the lifting ring is rotated relative to the lifting ramps 78 (anti-clockwise relating to FIG. 13), the abutting edges 76 slide along the lifting ramps 78 so that the lifting ring 74 is shifted in the axial direction.

For shifting the lifting ring 74 a so-called micro-gas generator 80 is provided which may be, for example, an igniter for a "large" gas generator as it is used to deploy a driver or passenger airbag. Basically, however, also any gas generator may be used which generates the desired amount of compressed gas within the desired period of time.

The micro-gas generator 80 is accommodated in a seat 82 within the case 72 which hereinafter shall be referred to as lifting case due to the lifting movement of the lifting ring 74 produced.

In the case 72 also a piston 84 which is in fluid communication with the micro-gas generator 80 is accommodated. The piston 84 abuts on an actuating tab 86 projecting from the lifting ring 74 in the radial direction. The actuating tab 86 in this case is formed integrally with the lifting ring.

Figure 14:
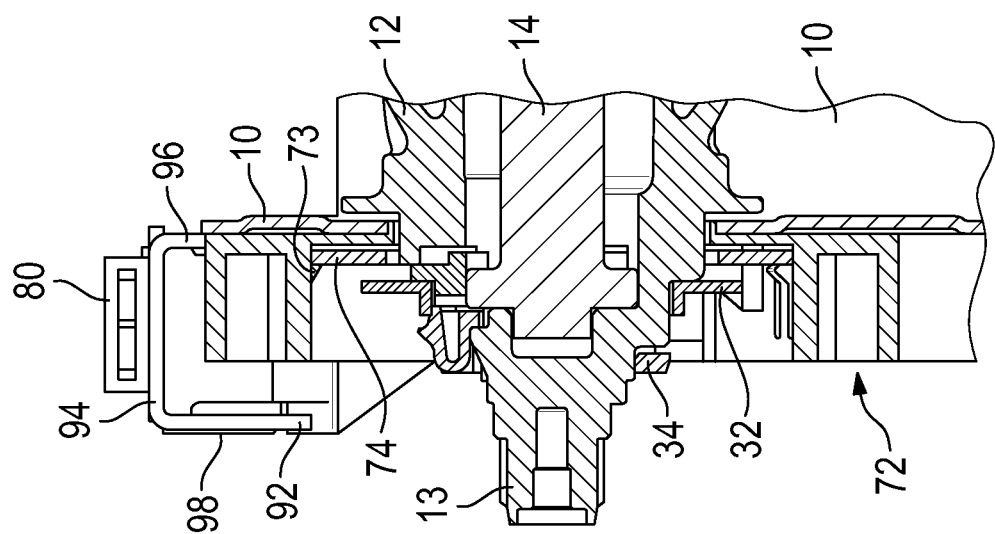
FIG. 14 schematically shows a broken-away sectional view across the belt retractor of FIG. 13 on the side of the belt reel provided with the actuator.

The lifting case 72 is attached to the frame 10 in the completely mounted state of the belt retractor (cf. FIGS. 13 and 14). The lifting ring 74 is provided in an initial position in which it is approximated to the leg of the frame 10 at which the lifting case 72 is disposed. The lifting ring 74 is located inside the support ring 32, i.e. between the support ring 32 and the area of the belt reel onto which the seat belt is wound.

The lifting ring is retained in its initial position by fixing tabs 73 so that there will be no friction with the support ring 32 co-rotating with the belt reel 12.

Figure 12:
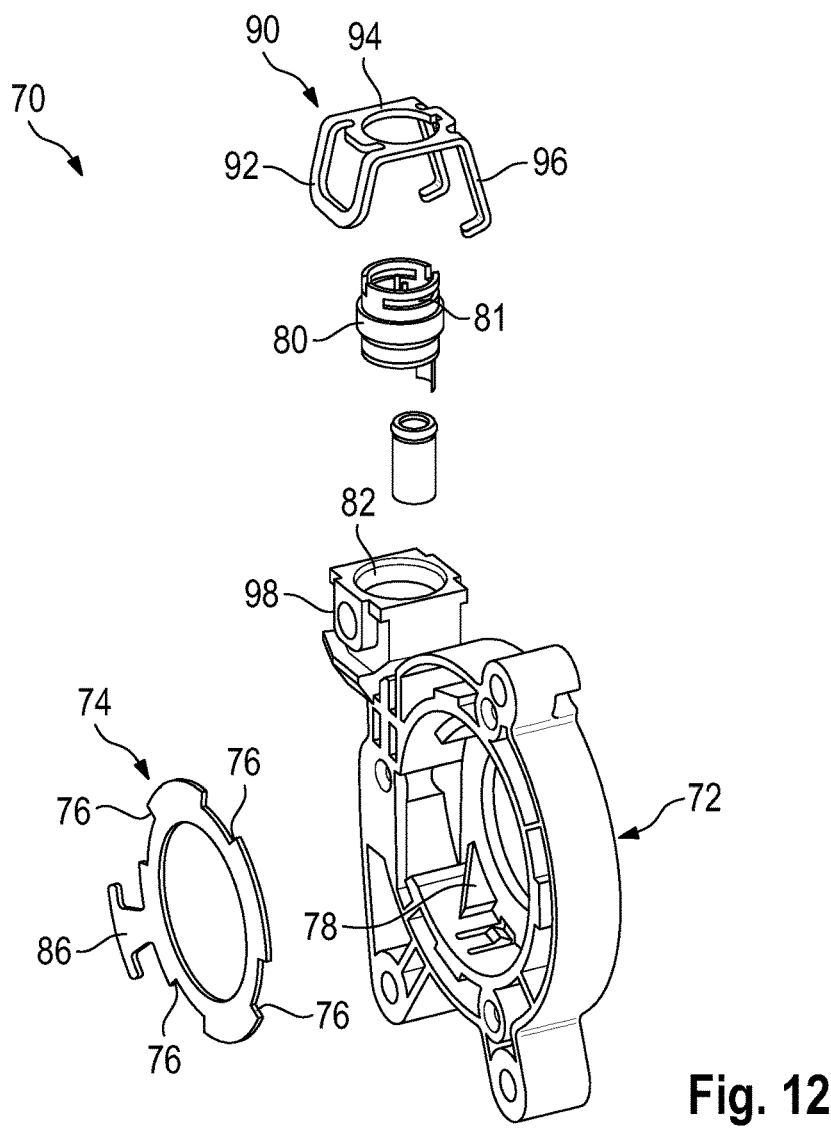
FIG. 12 shows an exploded view of an actuator employed in the belt retractor of FIG. 1.

The micro-gas generator 80 is locked in the seat 82 associated therewith within the lifting case 72 by means of a retaining clip 90 (cf. especially FIG. 12).

The retaining clip 90 is a bent sheet metal part including a bracket 92, a retaining portion 94 closed in the circumferential direction and two detent arms 96.

The bracket 92 is hooked in a counter bearing 98 provided at the lifting case 72 laterally from the seat 82 for the micro-gas generator 80.

The retaining portion 94 abuts on a shoulder 81 provided at the micro-gas generator 80 on the side facing away from the piston 84. Since the retaining portion 94 is closed in the circumferential direction, i.e. is ring-shaped, it is prevented from slipping off the micro-gas generator 80.

The detent arms 96 engage in appropriate recesses on the side of the lifting case 72 facing away from the counter bearing 98 laterally from the seat 82. As is evident especially from FIG. 14, the detent arms 96, which are located behind the sectional plane in this sectional view and therefore are not visible in FIG. 14, abut on the leg of the frame 10 on which the lifting case 72 is arranged. Therefore, they are pressed tightly against the lifting case 72 by the respective housing leg so that there they are prevented from leaving the detent recesses associated with them.

In this way, the micro-gas generator 80 is positioned with little effort, though very reliably, in the dedicated seat 82 within the lifting case 72.

Figure 15:
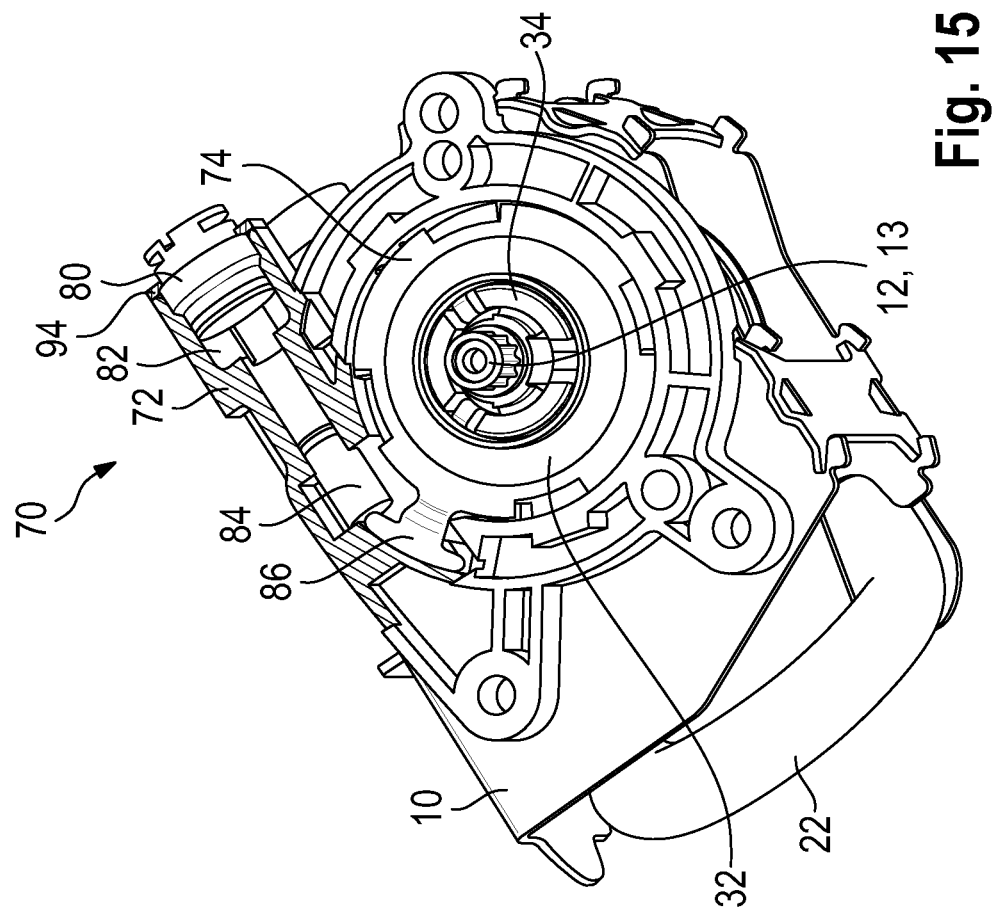
FIG. 15 shows a view corresponding to that of FIG. 13, with the actuator being provided in the released state.

When, starting from the state as shown in FIGS. 13 and 14, the micro-gas generator 80 is ignited, the piston 84 in the lifting case 72 is shifted so that the lifting ring (relating to FIGS. 13 and 15) is rotated anti-clockwise. The lifting ring 74 then performs, due to the lifting ramps 78, an axial stroke, namely away from the leg of the frame 10 on which the lifting case 72 is arranged outwardly in the axial direction (cf. FIGS. 14 and 16).

Figure 16:
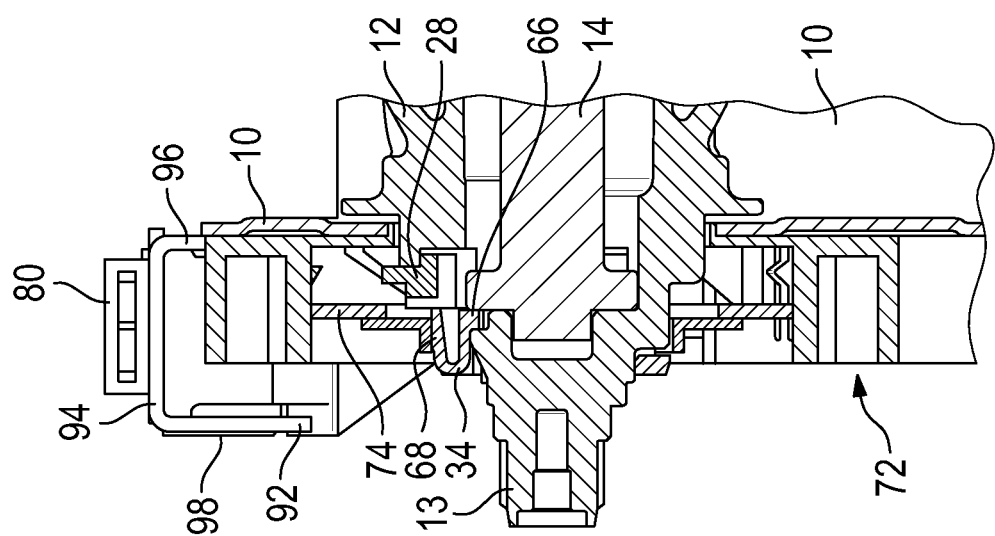
FIG. 16 shows a view corresponding to that of FIG. 14, with the actuator being provided in the released state.

During said stroke the support ring 32 is shifted relative to the holder 34 in the axial direction so far that the action of the retaining arms 68 is overcome and the support ring 32, when viewed in the axial direction, is located outside the bars 28 (cf. especially FIG. 16).

In this condition of the support ring 32, the bars 28 may yield outwardly in the radial direction, when a torque is transmitted between the belt reel 12 and the torsion rod 14. Said radial movement of the bars 28 is assisted by the flanks of the teeth 60 and of the driving toothing 26 being inclined so that a force acting radially outwardly on the bars 28 is generated.

The invention claimed is:

1. A belt retractor, comprising
   a frame (10),
   a belt reel (12) rotatably arranged within the frame (10),
   a blocking mechanism (18) by which the belt reel (12) can be blocked within the frame (10),
   a cover (38) laterally attached to the belt reel (12) in a rotationally fixed manner, and
   a load limiter which comprises a corrugated disk (36) disposed between the belt reel (12) and the cover (38).

2. The belt retractor according to claim 1, wherein the corrugated disk (36) is flat in the initial condition.

3. The belt retractor according to claim 1, wherein the corrugated disk (36) abuts on a first corrugated surface (46) dedicated to the belt reel (12).

4. The belt retractor according to claim 3, wherein the first corrugated surface (46) is formed by an end face of the belt reel (12).

5. The belt retractor according to claim 3, wherein the corrugated surface has a sinusoidal contour.

6. The belt retractor according to claim 3, wherein the corrugated disk (36) abuts on a second corrugated surface (48) dedicated to the cover (38).

7. The belt retractor according to claim 6, wherein at least one of the corrugated surfaces (46, 48) has a sinusoidal contour.

8. The belt retractor according to claim 1, wherein the corrugated disk (36) abuts on a second corrugated surface (48) dedicated to the cover (38).

9. The belt retractor according to claim 8, wherein the second corrugated surface (48) is formed by an inner surface of the cover (38).

10. The belt retractor according to claim 1, wherein the cover (38) is provided with plural lands (50) which engage in recesses (52) in the belt reel (12).

11. The belt retractor according to claim 1, wherein the belt reel (12) and the cover (38) are fastened to each other in the axial direction by means of a crimping ring (54).

12. The belt retractor according to claim 1, wherein on its inner circumference the corrugated disk (36) is provided with a driving design (42).

13. The belt retractor according to claim 12, wherein the driving design is a collar (42) which is formed integrally with the disk-shaped portion (40) of the corrugated disk (36) and has a toothed profile.

14. The belt retractor according to claim 12, wherein the driving design (42) is connected to a torsion rod (14) constituting a second load limiter in a rotationally fixed manner.

15. The belt retractor according to claim 14, wherein the corrugated disk (36) is connected to the belt reel (12) at one end of the belt reel (12) and the torsion rod (14) is connected to the belt reel (12) at the other end thereof.

16. A belt retractor, comprising:
    a frame (10);
    a belt reel (12) rotatably arranged within the frame (10);
    a blocking mechanism (18) by which the belt reel (12) can be blocked within the frame (10);

a cover (38) laterally attached to the belt reel (12);

a first load limiter including a torsion rod (14) extending through the belt reel (12); and a second load limiter including a corrugated disk (36) disposed between the belt reel (12) and the cover (38), an inner circumference of the corrugated disk (36) being connected to the torsion rod (14) in a rotationally fixed manner.

17. The belt retractor according to claim 16, wherein the inner circumference the corrugated disk (36) includes a driving design (42), the driving design (32) being connected to the torsion rod (14) in a rotationally fixed manner.

18. The belt retractor according to claim 17, wherein the driving design is a collar (42) which is formed integrally with the disk-shaped portion (40) of the corrugated disk (36) and has a toothed profile.

19. The belt retractor according to claim 16, wherein the corrugated disk (36) is connected to the belt reel (12) at one end of the belt reel and the torsion rod (14) is connected to the belt reel at the other end of the belt reel.

20. The belt retractor according to claim 16, wherein the cover (38) is connected to the belt reel (12) in a rotationally fixed manner.

\* \* \* \* \*